United States Patent
Chong et al.

(10) Patent No.: US 10,122,228 B2
(45) Date of Patent: Nov. 6, 2018

(54) SLEEVE FOR AN ELECTRICAL MACHINE

(71) Applicant: ROLLS-ROYCE plc, London (GB)

(72) Inventors: Ellis F H Chong, Derby (GB); Martyn A. Jones, Chesterfield (GB); Geraint W. Jewell, Sheffield (GB)

(73) Assignee: ROLLS-ROYCE plc, London (GB)

( * ) Notice: Subject to any disclaimer, the term of this patent is extended or adjusted under 35 U.S.C. 154(b) by 168 days.

(21) Appl. No.: 15/047,094

(22) Filed: Feb. 18, 2016

(65) Prior Publication Data
US 2016/0268854 A1    Sep. 15, 2016

(30) Foreign Application Priority Data

Mar. 13, 2015  (GB) .................................. 1504283.1

(51) Int. Cl.
  *H02K 1/27*  (2006.01)
  *H02K 15/14*  (2006.01)
  *H02K 1/28*  (2006.01)

(52) U.S. Cl.
  CPC .............. *H02K 1/274* (2013.01); *H02K 1/28* (2013.01); *H02K 15/14* (2013.01); *Y02E 10/725* (2013.01)

(58) Field of Classification Search
  CPC ........... H02K 1/28; H02K 1/274; H02K 15/14
  USPC ...................................... 310/156.23, 156.28
  IPC .............................................. H02K 1/27,15/14
  See application file for complete search history.

(56) References Cited

U.S. PATENT DOCUMENTS

| | | | | |
|---|---|---|---|---|
| 4,117,360 A * | 9/1978 | Richter | ................. | H02K 1/2773 310/156.55 |
| 4,531,071 A * | 7/1985 | Kintz, Jr. | ................. | H02K 1/276 29/598 |
| 4,638,200 A * | 1/1987 | Le Corre | ................. | H02K 1/276 310/156.28 |
| 5,744,887 A * | 4/1998 | Itoh | ................. | H02K 1/278 310/156.28 |
| 6,920,682 B2 * | 7/2005 | Ku | ................. | H02K 1/278 29/596 |
| 8,698,367 B2 * | 4/2014 | Sortore | ................. | H02K 1/2753 310/156.08 |
| 2003/0102759 A1 * | 6/2003 | Shah | ................. | H02K 21/042 310/181 |
| 2007/0090708 A1 * | 4/2007 | Takahashi | ................. | H02K 1/278 310/156.21 |
| 2010/0019602 A1 * | 1/2010 | Saban | ................. | H02K 1/02 310/156.28 |

(Continued)

FOREIGN PATENT DOCUMENTS

| CN | 102361385 A | 2/2012 |
|---|---|---|
| CN | 202231514 U | 5/2012 |

(Continued)

OTHER PUBLICATIONS

Jul. 29, 2016 Partial European Search Report issued in Patent Application No. EP 16156539.

(Continued)

*Primary Examiner* — John K Kim

(74) *Attorney, Agent, or Firm* — Oliff PLC

(57) ABSTRACT

A sleeve for retaining magnets around a rotor of an electrical machine. The sleeve is cylindrical and hollow, having axial length and having radial thickness between its inner surface and outer surface. The sleeve defines a plurality of axially spaced, circumferentially extending grooves. Each groove has radial depth which is less than the radial thickness of the sleeve.

17 Claims, 7 Drawing Sheets

(56) References Cited

U.S. PATENT DOCUMENTS

2013/0134825 A1    5/2013  Gayler et al.
2016/0268854 A1*   9/2016  Chong .................... H02K 1/28

FOREIGN PATENT DOCUMENTS

| EP | 1976096 A2 | 10/2008 |
| JP | H08-16303 A | 1/1996 |
| JP | H10-80081 A | 3/1998 |
| JP | 2014/090628 A | 5/2014 |
| WO | 97/18613 A1 | 5/1997 |
| WO | 2011/039143 A2 | 4/2011 |

OTHER PUBLICATIONS

Sep. 16, 2015 Search Report issued in British Patent Application No. 1504283.1.

* cited by examiner

SLEEVE FOR AN ELECTRICAL MACHINE

The present disclosure concerns a sleeve for retaining magnets around a rotor of an electrical machine. It also concerns a rotor comprising such a sleeve and an electrical machine comprising such a rotor.

An electrical machine comprises a rotor and a stator, one surrounding the other. In a permanent magnet electrical machine a plurality of magnets are provided as a circumferential array around the rotor. In order to hold the magnets onto the rotor it is necessary to provide a sleeve, such as one or more cylindrical bands that can be heat shrunk onto the magnets and rotor.

For an electrical machine operating at low speed and temperature it is possible to use carbon fibres wrapped around the magnets and rotor to retain the magnets in place. However, at higher speed and/or higher temperatures such fibres are not suitable and a metal or metal alloy sleeve is used. For example a hollow cylinder made of metal or metal alloy can be used.

One problem with such metallic sleeves is that large eddy currents are induced which loop through the full axial extent of the sleeve. This causes significant power losses in the electrical machine. Consequently there may be detrimental effects on an associated cooling system, localised hotspots in the electrical machine and/or lower efficiency in the electrical machine.

U.S. Pat. No. 8,698,367 teaches a retention device comprising a plurality of metallic washers which are stacked axially to give a segmented sleeve. The eddy currents thus do not cross from one washer to the next. One problem with this arrangement is that it is very difficult to accurately align the washers axially so that fitting is difficult and slow. Manufacture and stacking of many washers is also relatively costly.

According to a first aspect of the invention there is provided a sleeve for retaining magnets around a rotor of an electrical machine; the sleeve being cylindrical and hollow, having axial length and having radial thickness between its inner surface and outer surface; the sleeve defining a plurality of axially spaced, circumferentially extending grooves, each groove having radial depth less than the radial thickness of the sleeve.

Advantageously the sleeve reduces electrical losses. Advantageously the sleeve may be made of a metal and thus be suitable for a high speed electrical machine. Advantageously the sleeve has mechanical integrity because it is a single continuous cylinder.

The sleeve may comprise a radial bridge which is the difference between the radial thickness of the sleeve and the radial depth of each groove. The bridge may be greater than or equal to ⅓ (one-third) of the electrical skin depth of the sleeve. This bridge depth is appropriate where the eddy currents are inductance limited. The radial depth of each bridge may be equal to ⅓ (one-third) of the radial thickness of the sleeve. This bridge depth is appropriate where the eddy currents are resistance limited and so the electrical skin depth is greater than the radial thickness of the sleeve. Advantageously the bridge depth constraints act to minimise power losses in the sleeve due to eddy currents and electrical resistance.

All the grooves may have the same radial depth. Alternatively some or all of the grooves may have different radial depths to others of the grooves.

Each groove may extend circumferentially through less than 360°. Advantageously circumferential bridges are formed between circumferentially adjacent ends of the grooves which add mechanical strength to the sleeve. Each groove may extend circumferentially through at least 60°. Advantageously this ensures that there is a sufficient reduction in eddy currents due to the grooves.

A circumferential bridge may be defined between circumferential ends of one or two circumferentially aligned grooves. Axially adjacent circumferential bridges may be circumferentially offset. Advantageously this offers a more tortuous path for eddy currents to traverse. Two or more circumferential bridges may be axially aligned and circumferentially spaced. Axially aligned grooves may have equal circumferential extent. Thus the associated circumferential bridges may be equi-angularly spaced. Alternatively the circumferential bridges between axially aligned grooves may be unequally spaced around the circumference of the sleeve.

The grooves may extend from the outer surface of the sleeve. Alternatively or additionally the grooves may extend from the inner surface of the sleeve.

A first plurality of grooves may extend from the outer surface of the sleeve and a second plurality of grooves may extend from the inner surface of the sleeve. Advantageously it may be easier to machine grooves axially close together if alternate grooves extend from the inner and outer surfaces of the sleeve.

The combined radial depth of grooves extending from the outer and inner surfaces of the sleeve may be less than the radial thickness of the sleeve. Alternatively where a groove extending from the inner surface of the sleeve is axially offset from any groove extending from the outer surface of the sleeve the combined radial depth of the grooves may be greater than the radial thickness of the sleeve. In this case the ends of the grooves overlap radially but are spaced axially.

At least one groove from the first plurality of grooves may be axially aligned with at least one groove from the second plurality of grooves. The combined radial depth of axially aligned grooves extending from the outer and inner surfaces of the sleeve may be less than the radial thickness of the sleeve.

The sleeve may be metal. Advantageously the sleeve is suitable for use in a high speed electrical machine.

Also an electrical machine rotor comprising:
 a rotor shaft;
 a plurality of permanent magnets located in a circumferential array around the surface of the rotor shaft; and
 a sleeve as described, the sleeve being affixed radially outside the magnets to retain them to the rotor shaft.

Advantageously such an electrical machine rotor is suitable for a high speed and/or large diameter electrical machine in which the permanent magnets are subjected to large centrifugal forces.

Also an electrical machine rotor comprising:
 a rotor shaft;
 at least one electrical coil located on the surface of the rotor shaft; and
 a sleeve as described, the sleeve being affixed radially outside the electrical coil to retain it to the rotor shaft.

Advantageously such an electrical machine rotor is suitable for a high speed and/or large diameter electrical machine in which the electrical coil or coils is/are subjected to large centrifugal forces.

Also an electrical machine comprising an electrical machine rotor as described.

Also a method of fabricating a sleeve as described, the method comprising steps to:
 form a cylindrical sleeve; and cut axially spaced, circumferentially extending grooves into one or both radial surfaces of the sleeve.

The step to cut the grooves may be performed by water jet machining. Alternatively the step to cut the grooves may be performed by laser cutting.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
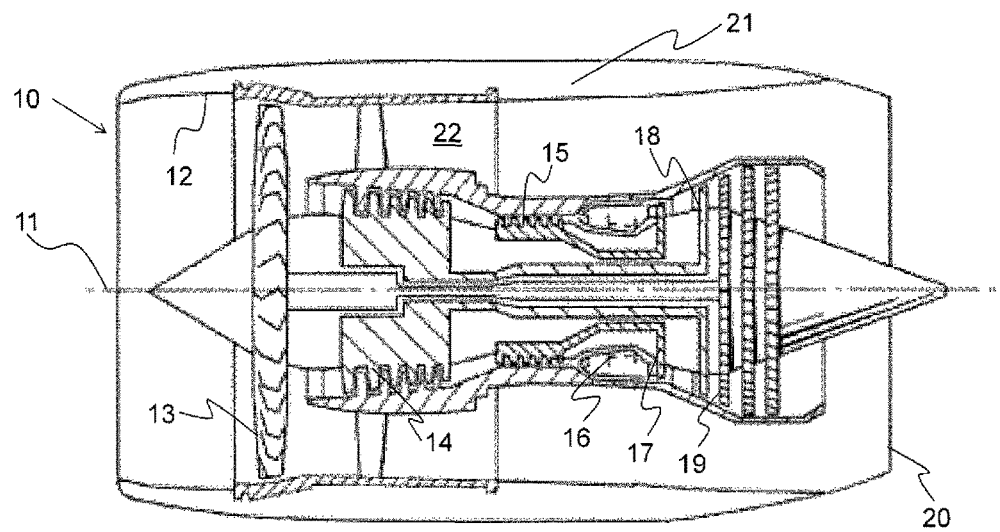
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Such a gas turbine engine 10 may be used to power an aircraft, to power a ship or in other marine applications, or may form part of a land or sea based power plant.

An electrical machine 24 may be associated with, coupled to or be driven by such a gas turbine engine 10. An electrical machine 24 may be mounted to the outside of a gas turbine engine 10, either directly or through an auxiliary gearbox. Alternatively an electrical machine 24 may be located within a gas turbine engine 10, for example by being directly mounted to one of the interconnecting shafts.

Such an electrical machine 24 may be constituted as a generator to provide electrical power to the gas turbine engine 10 or to the aircraft, ship or plant which is powered by the gas turbine engine 10. Alternatively or additionally an electrical machine 24 may be constituted as a motor to provide electrical power to start a gas turbine engine 10, or to power engine accessories such as oil or fuel pumps.

Figure 2:
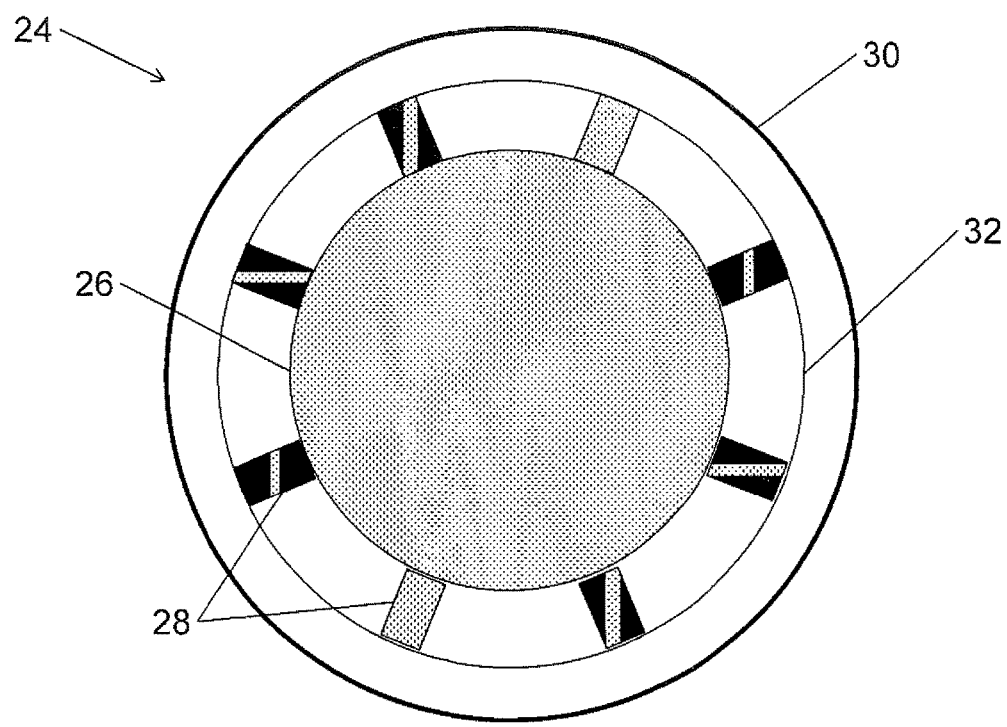
FIG. 2 is a schematic cross-section of an electrical machine.

An electrical machine 24 is shown in FIG. 2. It comprises a rotor 26 with a plurality of poles 28 at least partially provided by permanent magnets. Radially outside, and spaced from, the poles 28 of the rotor 26 is a stator 30. The magnets 28 are held firmly to the rotor 26 by a sleeve 32. The sleeve 32 is a hollow and cylindrical. To be suitable for high speed, and high temperature, operation of the electrical machine 24 the sleeve 32 is comprised of metal. For example, it may be formed from titanium, titanium alloy or a nickel-chromium alloy such as Inconel.

Figure 3:
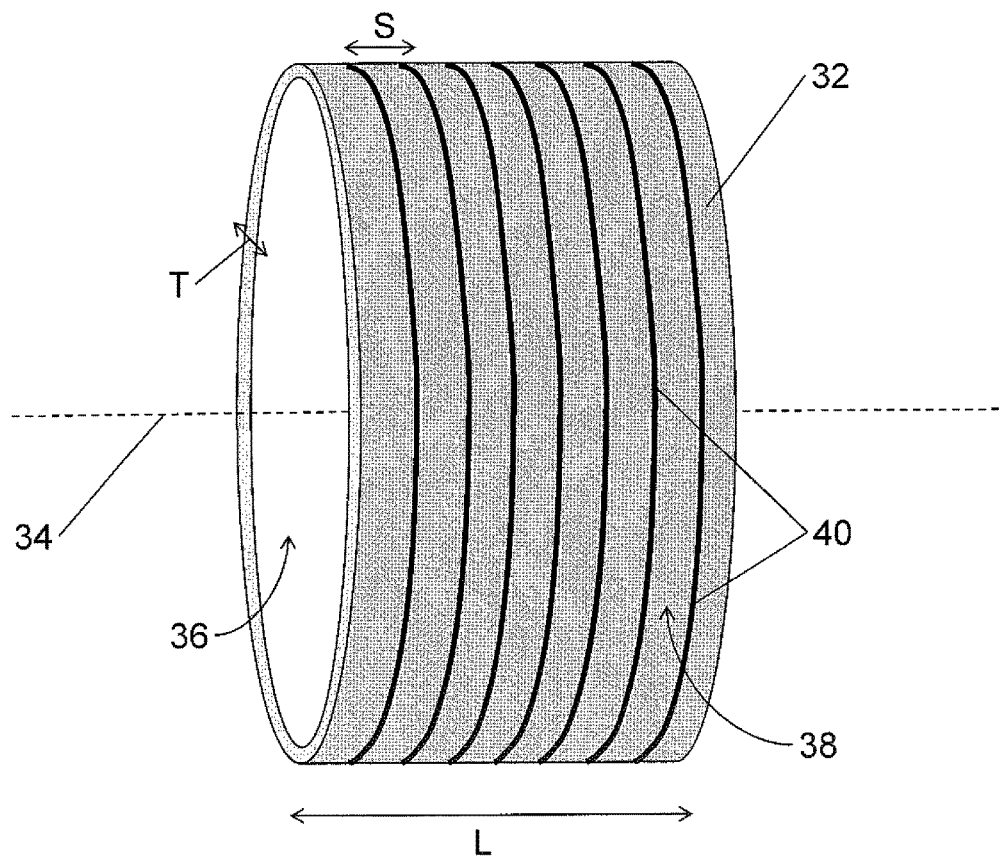
FIG. 3 is a perspective schematic drawing of a sleeve with grooves.

The sleeve 32 is shown in more detail in FIG. 3. The sleeve 32 is a cylinder that is symmetrical about an axis 34 and has axial length L in the direction parallel to the axis 34. When the sleeve 32 is mounted to the rotor 26 the axis 34 coincides with the axis about which the rotor 26 is symmetrical. Similarly, these axes coincide with the axis of the stator 30 and the electrical machine 24 when in use. The axial length L of the sleeve 32 may be the same as the axial length of the rotor 26. Alternatively it may be shorter or longer than the rotor 26, provided that it is long enough to secure the magnets to the poles 28 and thus to the rotor 26.

The sleeve 32 is a hollow cylinder. It therefore has radial thickness T which is the distance between the radially inner surface 36 and the radially outer surface 38 and which extends perpendicularly to the axis 34 of the sleeve 32. The sleeve 32 also includes a plurality of grooves 40. Each groove 40 extends circumferentially around the radially outer surface 38. The grooves 40 are axially spaced by spacing S so that the plurality of grooves 40 forms an axial array of circumferentially extending grooves 40. The spacing S may be constant between each adjacent pair of grooves 40 or may differ between pairs. This may be beneficial in managing any residual losses in the sleeve 32. There is a relationship between the spacing S and the electrical losses in the sleeve 32 such that a smaller spacing S results in lower electrical losses. This is because there are more grooves 40 for a given axial length of the sleeve 32. Each groove 40 may extend all the way around the circumference of the radially outer surface 38, that is through 360°.

Figure 9:
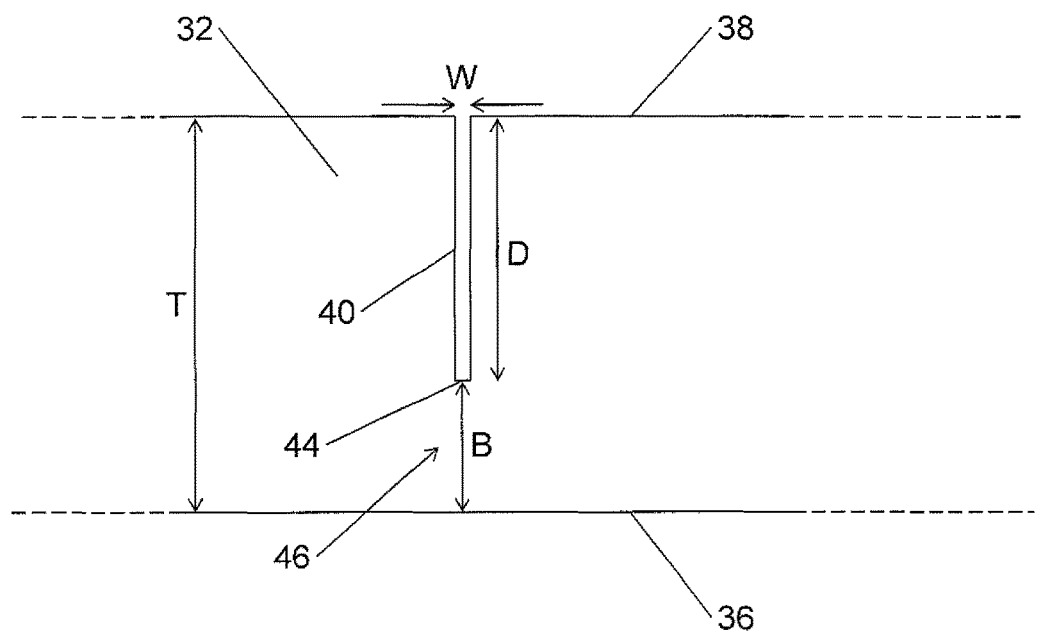
FIG. 9 is a schematic cross-section through a groove.

Each groove 40 is a trough or aperture into the radial thickness T of the sleeve 32 and may be rectangular in cross-section. It is formed of three walls, two parallel and one joining their ends. The fourth side of the rectangle is open and is flush with the radially outer surface 38 of the sleeve 32. The grooves 40 are aligned to be perpendicular to the eddy currents induced in the sleeve 32. Thus they usually extend radially. The cross-sectional form of the grooves 40 is shown in FIG. 9.

Figure 4:
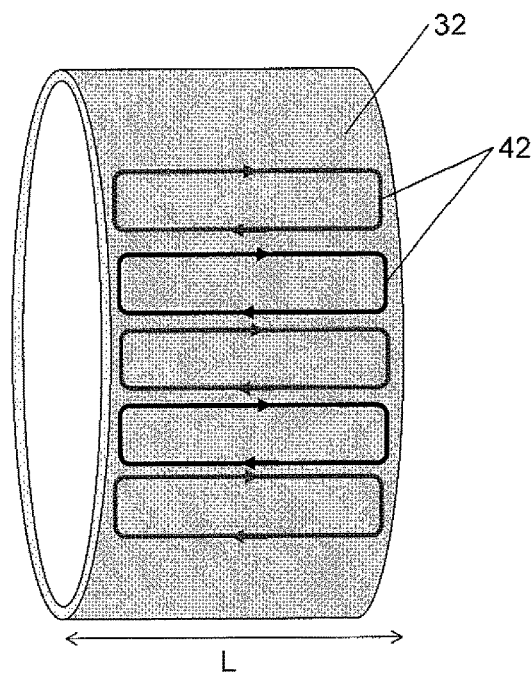
FIG. 4 is a perspective schematic drawing of a sleeve without grooves and illustrates eddy current paths.
Figure 5:
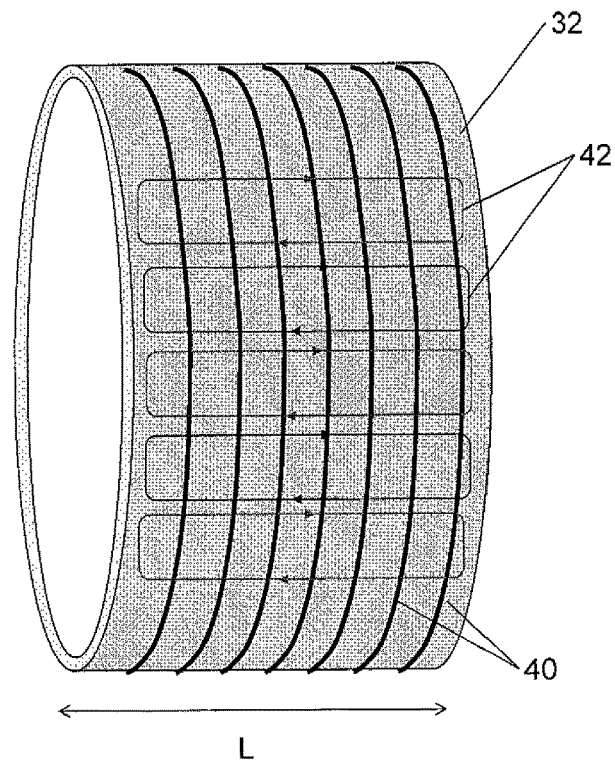
FIG. 5 is a perspective schematic drawing of a sleeve with grooves and illustrates eddy current paths.
Figure 6:
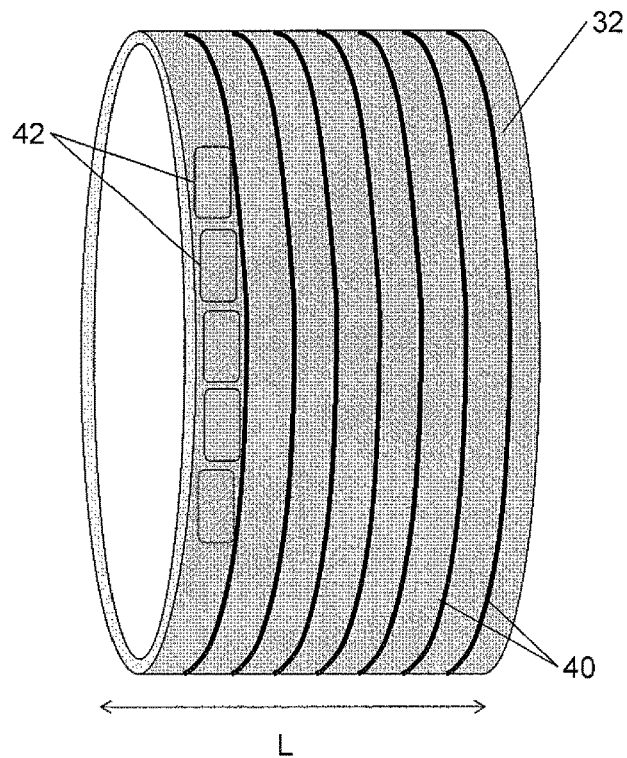
FIG. 6 is a perspective schematic drawing of a sleeve with grooves and illustrates eddy current paths.

Advantageously the grooves 40 disrupt the eddy current patterns that form on a metallic sleeve 32 without grooves 40. A sleeve 32 without grooves 40 is shown in FIG. 4. The eddy current loops 42 have large magnitude, shown by thick lines, and extend across the full axial length L of the sleeve 32. By contrast the grooves 40 in the sleeve 32 cause the magnitude of the eddy currents 42 to reduce, as shown in FIG. 5 by the thin lines, and/or the axial length of the eddy current loops 42 to reduce to cover only the axial distance between adjacent grooves 40, as shown in FIG. 6. FIG. 6 also shows that the magnitude of the eddy current loops 42 has reduced. The reduction in eddy currents consequently reduces the electrical power losses in the sleeve 32 because power is the product of current squared and resistance and so power loss is proportional to eddy current squared.

One or more of the grooves 40 may have lesser circumferential extent. For example, one or more of the grooves 40 may extend through only 60°. Each of the plurality of grooves 40 may extend through between 60° and 360°. Different ones of the plurality of grooves 40 may have different angular extent to others of the plurality of grooves 40. For example, one groove 40 may extend through 60° but a groove 40 that is axially adjacent to it may extend through 120°.

Figure 7:
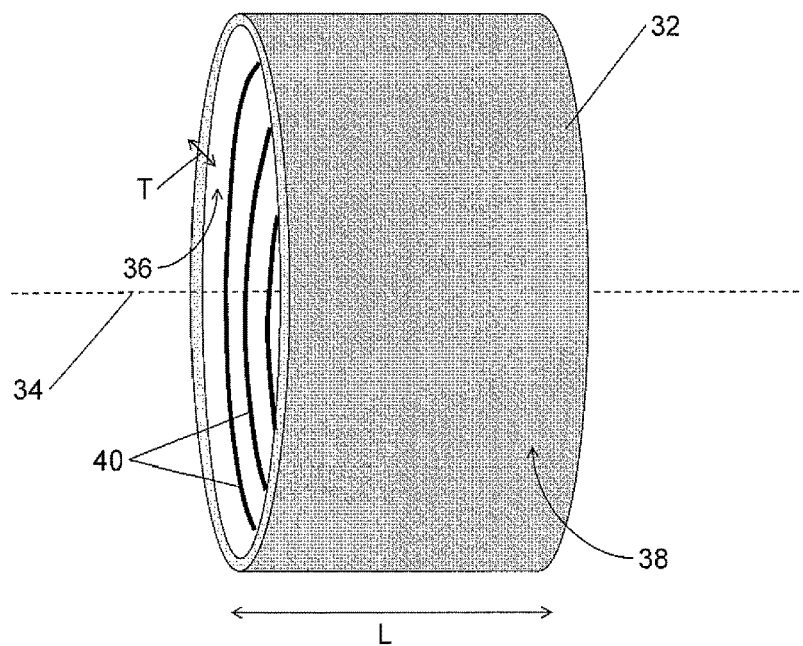
FIG. 7 is perspective schematic drawing of a sleeve with grooves.
Figure 8:
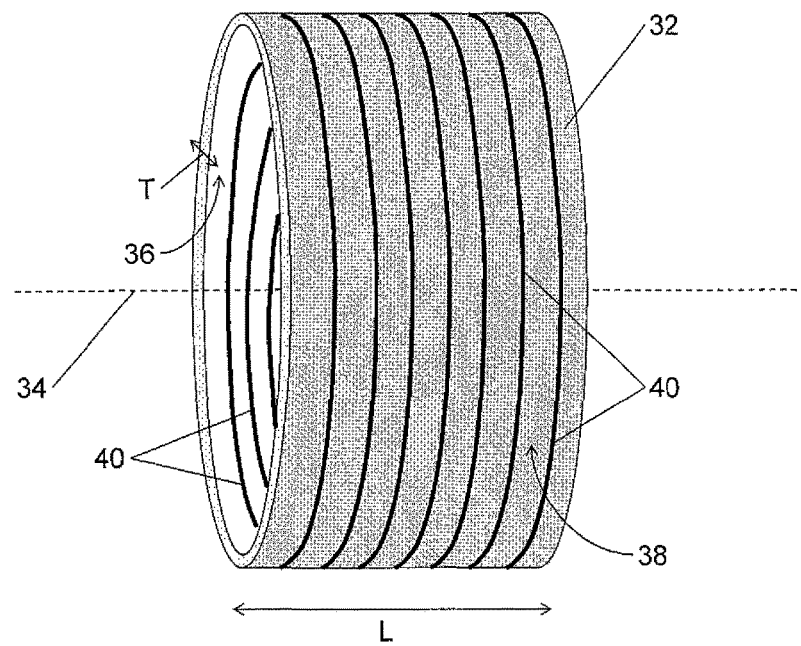
FIG. 8 is perspective schematic drawing of a sleeve with grooves.

FIG. 7 is substantially the same as FIG. 3. However, the grooves 40 extend circumferentially around the radially inner surface 36. FIG. 8 shows grooves 40 extending circumferentially on the radially inner surface 36 and on the radially outer surface 38.

FIG. 9 is a cross section through the sleeve 32, in a radial plane. One of the grooves 40 can be seen extending from the radially outer surface 38 of the sleeve 32. The groove 40 is rectangular in cross-section. Although drawn with a straight end 44, distal to the surface 38 from which it extends, it may instead have a radiused end 44. The shape of the end 44 is dependent on the manner of forming the groove 40.

The groove 40 has radial depth D which is the length between the radially outer surface 38 of the sleeve 32 and the distal end 44 of the groove 40. The groove 40 also has axial width W. This is the length of the discontinuity, in the axial direction, in the radially outer surface 38 as a result of the groove 40.

The part of the sleeve 32 between the end 44 of the groove 40 and the other, radially inner, surface 36 is a bridge 46. The depth B of the bridge 46, in the radial direction, plus the radial depth D of the groove 40 is equal to the radial thickness T of the sleeve 32.

The sleeve 32 is formed of metal or a metal alloy. The sleeve 32 therefore has electrical resistance R equal to the axial length multiplied by the electrical resistivity ρ divided by the cross-sectional area. The resistance R of the sleeve 32 locally to each groove 40 is increased because the cross-sectional area is decreased. The equivalent cross-sectional area for a portion of the sleeve 32 without a groove 40 is the width W multiplied by the radial thickness T of the sleeve 32. The cross-sectional area for the sleeve 32 where a groove 40 is provided is only the width W multiplied by the bridge depth D, which is considerably smaller than the radial thickness T of the sleeve 32. The reduction in local cross-sectional area also reduces the electrical power losses in the sleeve 32 because power is the product of current squared and resistance and so power loss is proportional to the resistance R of the sleeve 32.

The sleeve 32 has an electrical skin depth δ which is dependent on the electrical conductivity σ of the sleeve 32, the relative magnetic permeability $\mu_r$ of the sleeve 32, the permeability of free space $\mu_o$ and the excitation frequency f of the induced eddy currents. The electrical conductivity σ and the relative magnetic permeability $\mu_r$ are each material properties of the sleeve 32; the permeability of free space $\mu_o$ is a physical constant, $\mu_o = 4\pi \times 10^{-7}$ NA$^{-2}$. Specifically, the electrical skin depth δ is defined as $$\delta = \sqrt{\frac{1}{\sigma \mu_r \mu_o (2\pi f)}}.$$

The electrical skin depth δ may be larger or smaller than the radial thickness T of the sleeve 32 since it depends on material properties rather than physical dimensions.

Where the electrical skin depth δ is larger than the radial thickness T of the sleeve 32, the eddy currents are limited by the resistance R. In this case the bridge depth B is set to one-third of the radial thickness T, so that the radial depth D of the groove 40 is two-thirds of the radial thickness T of the sleeve 32. On the other hand, where the electrical skin depth δ is smaller than the radial thickness T of the sleeve 32 the eddy currents are inductance limited. In this case the radial depth D of the groove 40 is governed by setting the bridge depth B to be at least one-third of the electrical skin depth δ. Advantageously these constraints on the bridge depth B, and therefore on the radial depth D of the grooves 40, act to minimise the power losses in the sleeve 32 due to eddy currents and electrical resistance R.

Other groove depths D may also be used, although the power losses in these cases will be reduced rather than minimised.

The explanation of the dimensions of the groove 40 and bridge 46 given in respect to FIG. 9 is applicable, mutatis mutandis, where the groove 40 extends from the radially inner surface 36 instead of from the radially outer surface 38.

Figure 10:
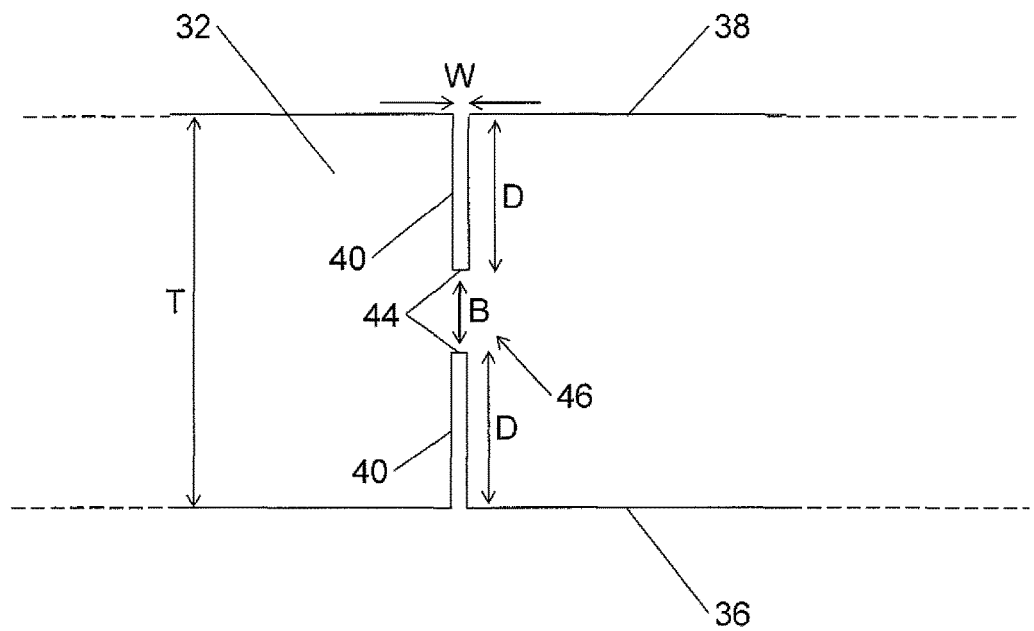
FIG. 10 is a schematic cross-section through a pair of axially aligned grooves.

In FIG. 10 there are two grooves 40, one of which extends from the radially inner surface 36 and one of which extends from the radially outer surface 38. Thus the bridge 46 is located radially between the ends 44 of the grooves 40 rather than being adjacent to one of the surfaces 36, 38. The grooves 40 may have the same radial depth D as each other or may have different radial depths D. The radial thickness T of the sleeve 32 is equal to the sum of the radial depths D of the two grooves 40 and the bridge depth B.

Figure 11:
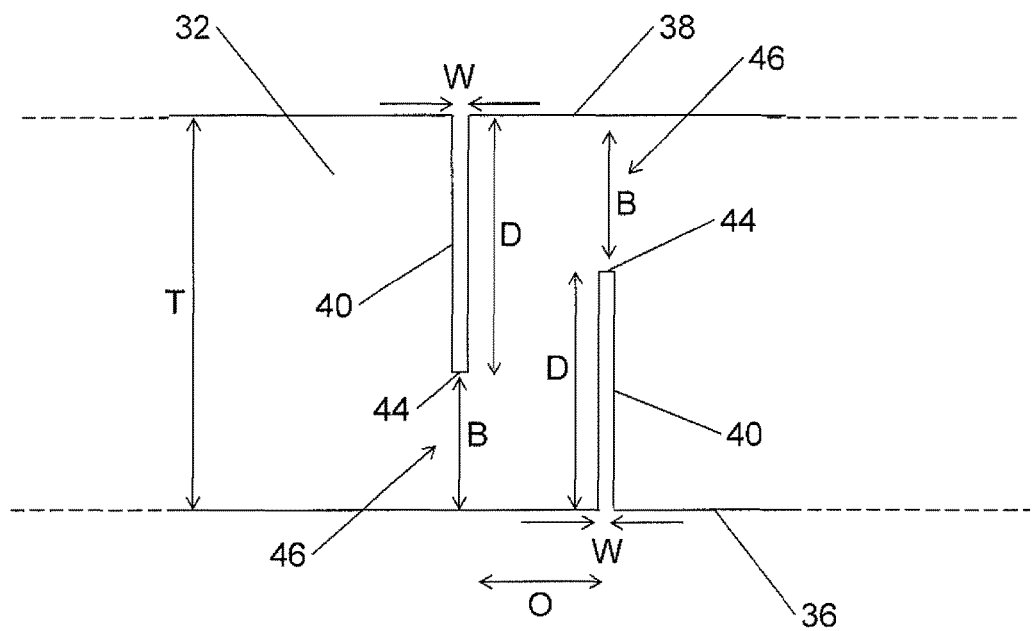
FIG. 11 is a schematic cross-section through a pair of axially spaced grooves.

FIG. 11 illustrates a pair of axially adjacent grooves 40 in a sleeve 32. One of the grooves 40, drawn on the left of the figure, extends from the radially outer surface 38 whilst the other of the grooves 40, drawn on the right of the figure, extends from the radially inner surface 36. The width W of each groove 40 may be the same as the other groove 40 or the widths W may differ. The grooves 40 are spaced apart axially by offset O. The offset O may be greater than the axial width W of either of the grooves 40. The offset O is less than the spacing S between adjacent grooves 40 extending from the same one of the surfaces 36, 38. Each of the grooves 40 has sufficient radial depth D so that its distal end 44 overlaps radially with the distal end 44 of the other groove 40. Advantageously this arrangement ensures that no portion of the sleeve 32 offers a straight path in an axial direction through which eddy currents can flow. Thus it guarantees that the eddy currents will follow a tortuous path, and therefore be reduced, whilst not compromising the mechanical integrity of the sleeve 32.

A combination of axially aligned and axially offset grooves 40 may be provided on a sleeve 32 having grooves 40 extending from both the radially inner and radially outer surfaces 36, 38.

Figure 12:
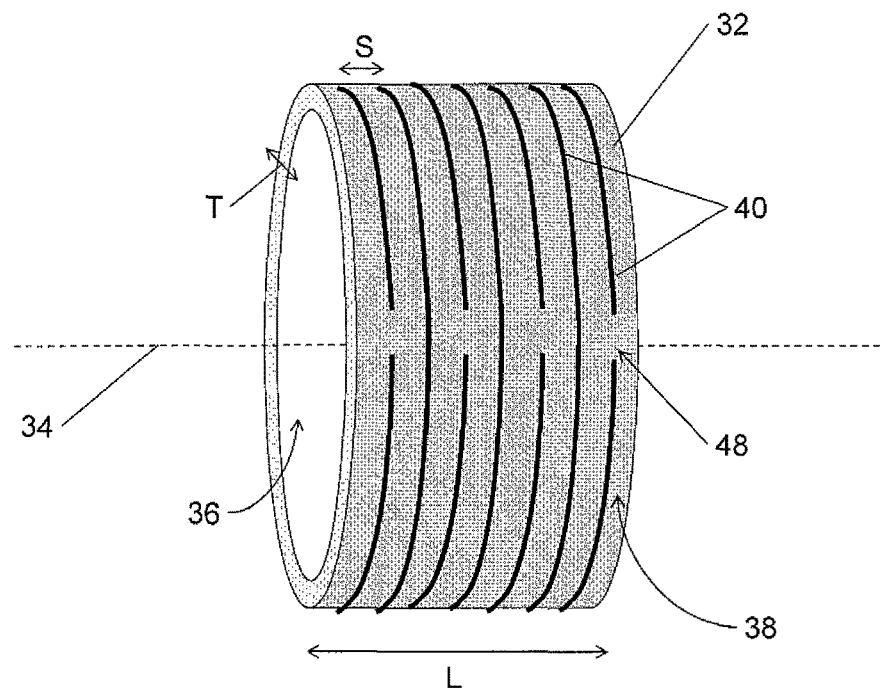
FIG. 12 is perspective schematic drawing of a sleeve with grooves.

FIG. 12 illustrates a sleeve 32 having grooves 40 in its radially outer surface 38. However, the specific features are equally applicable to grooves 40 in the radially inner surface 36 of the sleeve 32 or to grooves 40 being provided in both surfaces 36, 38, whether or not those grooves 40 are axially aligned or include an offset O.

The grooves 40 at least some of the axial positions the grooves extend through less than 360°. For example there may be a single groove 40 at each axial position which extends only a few degrees less than 360° so that a circumferential bridge 48 is left between the circumferential ends 50 of the groove 40. Alternatively there may be two grooves 40 from the radially outer surface 38 at a given axial alignment. The grooves 40 may extend by an equal amount or be of unequal circumferential lengths. For example, each groove 40 may extend less than 180° and be the same circumferential length so that there are two circumferential bridges 48 diametrically opposed around the surface 38.

At axial positions adjacent to circumferentially shorter grooves 40, the grooves 40 may be fully circumferential, extending 360°. Alternatively they may also be shorter or there may be a pair of axially aligned grooves 40 extending from the radially outer surface 38. In these cases the grooves 40 are arranged so that the circumferential bridges 48 are circumferentially offset from the adjacent circumferential bridges 48. Advantageously this prevents there being a long axial path available for eddy currents.

Figure 13:
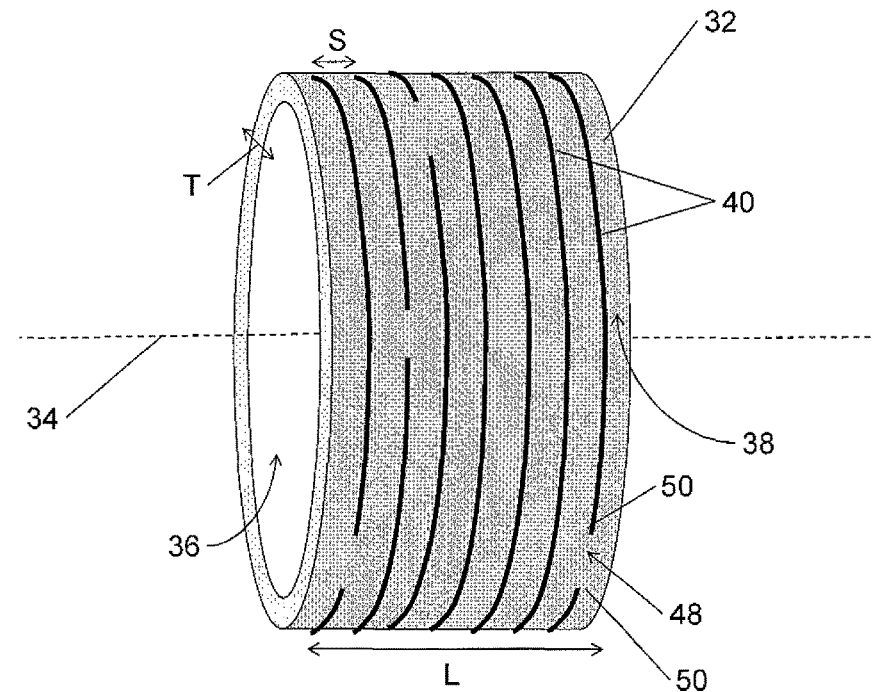
FIG. 13 is perspective schematic drawing of a sleeve with grooves.

In FIG. 12 there may be one circumferential bridge 48 for each axial position of grooves 40. Axially adjacent circumferential bridges 48 are offset by approximately 180°. In FIG. 13 adjacent circumferential bridges are offset by approximately 60°.

In FIG. 13 there may be more than one circumferential bridge 48 for each axial position of the grooves 40. For example there may be two circumferential bridges 48 at each axial position of the grooves 40 which are offset by 180°, or there may be three circumferential bridges 48 at each axial position of the grooves 40, with each pair of the circumferential bridges 48 offset by 120°. In FIG. 12 there may be two circumferential bridges 48, spaced 180° apart, for each axial position of the grooves 40. Circumferential bridges 48 in adjacent axial positions are then offset by 90°. Different circumferential offsets are also envisaged, for example within the range 30° to 180° in either the clockwise sense or the anticlockwise sense. Where there is more than one circumferential bridge 48 at one axial alignment, the circumferential offsets between circumferentially adjacent bridges 48 may be different. Thus with two axially aligned circumferential bridges 48 the circumferential offset in one direction may be 120° and the circumferential offset in the other direction may be 240°.

Each groove 40 extends through at least 60°. Advantageously this ensures there is a sufficient effect on the electrical power losses.

The sleeve 32 has greater mechanical integrity than the stack of washers known from U.S. Pat. No. 8,698,367. It is therefore easier to fit to the poles 28 of a rotor 26, for example by heat shrinking. Stress concentration on the sleeve 32 is also low due to the bridge 46 portions.

A method of fabricating the sleeve 32 may comprise forming a hollow cylindrical sleeve 32 and then machining or cutting axially spaced, circumferentially extending grooves 40 into one or both of its radial surfaces 36, 38. The machining or cutting may be performed by water jet machining. Advantageously this does not create stress points at the circumferential ends 50 of the grooves 40. Alternatively the grooves 40 may be machined or cut by laser.

Advantageously the sleeve 32 protects the environment in which the electrical machine 24 operates.

The sleeve 32 is also applicable in an electrical machine 24 in which the stator 30 is inside the rotor 26. In this case the sleeve 32 surrounds the rotor 26 and acts to retain the electrical coil or coils against the centrifugal force.

The sleeve 32 has application for any electrical machine 24 which experiences a high rim speed. Such high speed electrical machines 24 are used in automotive, kinetic energy recovery systems (KERS) for Formula 1 and other vehicles, diesel engines, and fly wheel energy storage. The sleeve 32 also finds application in direct drive applications with large diameter, such as marine gas turbine engines, wind turbines and tidal turbines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A sleeve for retaining magnets around a rotor of an electrical machine, the sleeve comprising:
a body that is cylindrical and hollow, the body having an inner surface and an outer surface, the body having an axial length and a radial thickness between the inner surface and the outer surface; and
a first plurality of axially spaced, circumferentially extending grooves formed in the inner surface of the body, each groove of the first plurality of grooves having a radial depth less than the radial thickness of the sleeve and extending circumferentially through less than 360°.

2. The sleeve as claimed in claim 1, wherein a radial bridge is a difference between the radial thickness of the sleeve and the radial depth of each groove of the first plurality of grooves, the radial bridge being greater than or equal to ⅓ of an electrical skin depth of the sleeve.

3. The sleeve as claimed in claim 2, wherein the radial depth of each radial bridge of each groove of the first plurality of grooves is equal to ⅓ of the radial thickness of the sleeve where the electrical skin depth is greater than the radial thickness of the sleeve.

4. The sleeve as claimed in claim 1, wherein the grooves of the first plurality of grooves have the same radial depth.

5. The sleeve as claimed in claim 1, wherein each groove of the first plurality of grooves extends circumferentially through at least 60°.

6. The sleeve as claimed in claim 1, wherein a circumferential bridge is defined between circumferential ends of one or two circumferentially aligned grooves of the first plurality of grooves, and axially adjacent circumferential bridges are circumferentially offset.

7. The sleeve as claimed in claim 6, wherein two or more circumferential bridges are axially aligned and circumferentially spaced.

8. The sleeve as claimed in claim 7, wherein the axially aligned grooves of the first plurality of grooves have equal circumferential extent.

9. The sleeve as claimed in claim 1, further comprising a second plurality of grooves extending around the outer surface of the sleeve.

10. The sleeve as claimed in claim 9, wherein at least one groove of the first plurality of grooves is radially aligned with at least one groove of the second plurality of grooves.

11. The sleeve as claimed in claim 9, wherein a combined radial depth including the radial depth of the first plurality of grooves and a radial depth of the second plurality of grooves is less than the radial thickness of the sleeve.

12. The sleeve as claimed in claim 1, wherein the sleeve is metal.

13. An electrical machine rotor comprising:
a rotor shaft;
a plurality of permanent magnets located in a circumferential array around a surface of the rotor shaft; and
the sleeve as claimed in claim 1, the sleeve being affixed radially outside the plurality of permanent magnets to retain them to the rotor shaft.

14. An electrical machine rotor comprising:
a rotor shaft;
at least one electrical coil located on a surface of the rotor shaft; and
the sleeve as claimed in claim 1, the sleeve being affixed radially outside the at least one electrical coil to retain the at least one electrical coil to the rotor shaft.

15. An electrical machine comprising the electrical machine rotor as claimed in claim 13.

16. A method of fabricating the sleeve as claimed in claim 1, the method comprising steps to:
form the cylindrical sleeve; and
cut the first plurality axially spaced, circumferentially extending grooves into the inner surface of the sleeve.

17. A method as claimed in claim 16, wherein the step to cut the grooves is performed by water jet machining.

* * * * *